US012785517B2

(12) United States Patent
Ruppert

(10) Patent No.: US 12,785,517 B2
(45) Date of Patent: Nov. 3, 2026

(54) METHOD FOR PRODUCING AN ELECTRICAL CIRCUIT DEVICE FOR OPERATING AN EXTERNALLY EXCITED ELECTRIC MACHINE, ELECTRICAL CIRCUIT DEVICE FOR OPERATING AN EXTERNALLY EXCITED ELECTRIC MACHINE, ELECTRIC DRIVE DEVICE COMPRISING AN ELECTRICAL CIRCUIT DEVICE, AND MOTOR VEHICLE COMPRISING AN ELECTRIC DRIVE DEVICE

(71) Applicant: AUDI AG, Ingolstadt (DE)

(72) Inventor: Daniel Ruppert, Lenting (DE)

(73) Assignee: AUDI AG, Ingolstadt (DE)

(*) Notice: Subject to any disclaimer, the term of this patent is extended or adjusted under 35 U.S.C. 154(b) by 289 days.

(21) Appl. No.: 18/651,267

(22) Filed: Apr. 30, 2024

(65) Prior Publication Data

US 2024/0372444 A1 Nov. 7, 2024

(30) Foreign Application Priority Data

May 2, 2023 (DE) ........................ 102023111216.3

(51) Int. Cl.
*H02K 11/33* (2016.01)
*H02K 9/22* (2006.01)

(52) U.S. Cl.
CPC ............. *H02K 11/33* (2016.01); *H02K 9/227* (2021.01)

(58) Field of Classification Search
CPC .............................. H02K 11/33; H02K 9/227
USPC ............................................................ 310/64
See application file for complete search history.

(56) References Cited

U.S. PATENT DOCUMENTS 11,659,698 B2 5/2023 Ruppert

FOREIGN PATENT DOCUMENTS

| | | | | |
|---|---|---|---|---|
| DE | 102010022562 A1 * | 12/2011 | ............ | H10W 40/60 |
| DE | 102019125733 A1 | 3/2021 | | |
| DE | 102019128721 A1 * | 4/2021 | ............ | H10W 40/47 |
| DE | 102019132685 A1 | 6/2021 | | |
| DE | 102020211423 A1 | 3/2022 | | |

* cited by examiner

*Primary Examiner* — Jose A Gonzalez Quinones
(74) *Attorney, Agent, or Firm* — Seed Intellectual Property Law Group LLP

(57) ABSTRACT

A method for producing an electrical circuit device for operating an externally excited electric machine is provided and may comprise positioning and attaching at least one power module at a marked attachment position on an outside of a heat sink, positioning at least one exciter module on the outside of the heat sink, attaching the exciter module to the outside of the heat sink. The at least one power module may include power module-side connecting pins. The at least one exciter module may include exciter module-side connecting pins. During the positioning, at least one heat sink-side positioning section may be inserted into or may receive at least one exciter module-side positioning section. After attaching the power module and the exciter module to the heat sink, a control board may be plugged onto the power module-side and the excited module-side connecting pins pointing in the same direction.

16 Claims, 3 Drawing Sheets

METHOD FOR PRODUCING AN ELECTRICAL CIRCUIT DEVICE FOR OPERATING AN EXTERNALLY EXCITED ELECTRIC MACHINE, ELECTRICAL CIRCUIT DEVICE FOR OPERATING AN EXTERNALLY EXCITED ELECTRIC MACHINE, ELECTRIC DRIVE DEVICE COMPRISING AN ELECTRICAL CIRCUIT DEVICE, AND MOTOR VEHICLE COMPRISING AN ELECTRIC DRIVE DEVICE

BACKGROUND

Technical Field

The present disclosure relates to an electrical circuit device for operating an externally excited electric machine, such as an electrical circuit device for an electric drive device of a motor vehicle.

Description of the Related Art

Electrical circuit devices may be used to operate externally excited electric machines. For this purpose, a stator of the electric machine may be energized with an alternating current, which is generated from a direct current, by way of an inverter circuit, which is implemented by at least one power module of the electrical circuit device. An excitation current may be generated from the direct current by way of an exciter circuit, which is implemented by an exciter module, which may be used to energize an excitation winding or a rotor winding of the electric machine. In this way, an externally excited electric machine may be operated by the electrical circuit device.

A separate control board is typically provided to control the exciter module and the power module. Furthermore, during operation of the exciter module and the power module, heating of these modules typically occurs due to the existing electrical currents, which results in the need for appropriate cooling.

For example, DE 102020211423A1 discloses a method for producing an inverter for an electric drive of an electric vehicle. In this method, initially, a heat sink is provided, with an inverter module then being arranged on it and then connected to the heat sink. The heat sink has a positioning aid, which the inverter module is positioned and aligned thereon.

Further power modules, in which an exciter circuit, an inverter circuit and a cooler are provided, are known from DE 102019128721A1 and DE 102019125733A1.

BRIEF SUMMARY

The present disclosure provides an electrical circuit device for operating an externally excited electric machine, which may provide simplified manufacturability.

According to the disclosure, a method for producing an electrical circuit device for operating an externally excited electric machine may comprise the following steps:

providing a heat sink, positioning and attaching at least one power module at a marked attachment position on an outside of the heat sink, positioning at least one exciter module on the outside of the heat sink, at least one heat sink-side positioning section being inserted into at least one exciter module-side positioning section, or vice versa, attaching the exciter module to the outside of the heat sink, wherein the power module has power module-side connecting pins and the exciter module has exciter module-side connecting pins, wherein, after attaching the power module and the exciter module to the heat sink, a control board is plugged onto the connecting pins pointing in the same direction.

The circuit device which may be produced using the method according to the present disclosure comprises the heat sink, which is in thermal contact, such as physical contact, with the power module and the exciter module for cooling these components. The heat sink may be a plate-like, such as cuboid, structural component.

As part of the method according to the present disclosure, the heat sink is equipped with the power module and the exciter module. The power module may first be positioned at a correspondingly marked or predetermined attachment position on an outside of the heat sink and then fastened.

The exciter module may then be positioned on the same side of the heat sink or on a different side with respect to the power module. According to the present disclosure, this positioning may occur by way of the heat sink-side positioning section and the exciter module-side positioning section. Specifically, one of the positioning sections may be inserted into the other positioning section, with the positioning sections forming a male and a female connecting part in some embodiments. The positioning sections may enable the exciter module to be automatically positioned in its intended position with respect to the heat sink and the power module. This positioning may create tolerances with regard to the positioning which may be significantly smaller compared to other methods of positioning the exciter module on the heat sink, such as when the exciter module is, for example, simply placed on the heat sink and screwed on. After the exciter module has been placed in its intended position by way of the positioning sections, the exciter module may then be attached to the heat sink.

According to the present disclosure, both the power module and the exciter module may have connecting pins by which the respective module may be electrically coupled to a control board. The control board may be a printed circuit board that is equipped with semiconductor electronic components required to control the modules. The connecting pins, or open end sections of the connecting pins, point in the same direction. Thus, the elongated connecting pins may run parallel to one another with respect to their longitudinal direction. The, connecting pins, which may be I-shaped, may be arranged on the top of the respective module and may protrude vertically from the respective module. The, connecting pins, which may be L-shaped, may protrude laterally from the respective module.

Due to the small tolerances that exist when positioning the exciter module on the heat sink due to the positioning sections, the connecting pins pointing in the same direction enable a common or one-piece control board to be connected to these modules by the plug-on method provided according to the present disclosure. The present disclosure therefore may enable a single circuit board design. In the method according to the present disclosure, it may therefore not be necessary to connect the power module and the exciter module each to a separate circuit board. Consequently, material costs resulting from the use of separate circuit boards may be saved. Furthermore, no plug connectors may be required between these circuit boards, so that the assembly effort relating to the production of the electrical circuit device may be reduced accordingly.

The power module may be referred to as an inverter module or may form an inverter module. The exciter module may form an exciter circuit and, in addition to the exciter circuit, may comprise further components and/or circuits. The exciter circuit may be configured as a direct voltage converter (DC/DC converter). The exciter module may, for example, comprise a full bridge, an asymmetrical full bridge, a quasi-full bridge, or a similar circuit that enables a direct current received via a DC connection of the exciter module to be converted into an excitation current for energizing the excitation winding. Depending on the configuration of the exciter circuit, the exciter circuit may specify or change an excitation voltage or an excitation current intensity and/or a current direction of the excitation current.

The exciter module may be electrically coupled to a capacitor via the DC connection. The DC connection may be configured as the input of the exciter circuit with regard to the current supply to the excitation winding. On the output side, the exciter circuit may be connected to the exciter or rotor winding of the electric machine, such as via slip ring contacts. The capacitor may be an intermediate circuit capacitor which, in addition to the at least one DC connection of the exciter module, may also be connected to the DC side of the power module. The capacitor may be connected as an X capacitor and may be configured to filter interference in a DC intermediate circuit.

The exciter module and/or the power module may be a cast or molded structural component, such that a housing of the respective module may be formed by a casting compound, from which at least one power connection for contacting electronic components arranged inside the respective module is led to the outside. The exciter module and/or the power module may have a plate-like, such as cuboid, shape. In some embodiments, the exciter module may have two DC connections, each of which may be connected to a different connection of the capacitor.

In the method according to the present disclosure, a fitting connection may be formed when the heat sink-side positioning section is inserted into the exciter module-side positioning section, or vice versa. Thus, the dimensions of the positioning sections may be adapted to one another such that only extremely small or negligible tolerances occur when the positioning section is inserted into the other positioning section. In some embodiments, an outer dimension of the positioning section provided as the male connecting part may correspond to the inner dimension of the positioning section provided as the female connecting part.

In some embodiments, one of the positioning sections may be an insertion cylinder, with the other positioning section being a recess with a shape that is the opposite of the insertion cylinder. The insertion cylinder and/or the recess, which may also be referred to as a bore, may be chamfered to facilitate the corresponding insertion. In some embodiments, the heat sink-side positioning section of the plug-in cylinder and the exciter module-side positioning section may be the recess.

Furthermore, the exciter module-side positioning section provided as the recess may pass through the exciter module across its entire width. In such embodiments, the recess may be open on both sides. According to some embodiments, the insertion cylinder which may be hollow along its longitudinal direction. The insertion cylinder may either have an internal thread into which a screw is screwed to attach the exciter module to the heat sink, or may be a hollow rivet into which a rivet is inserted to attach the exciter module to the heat sink. The open side of the recess facing away from the insertion direction may enable the screw or rivet to be connected to the hollow insertion cylinder, such as by way of a screwdriver. In some embodiments, a head of the screw or rivet may be flush with the surface of the exciter module. The head may be accommodated in the chamfered area of the recess.

In the method according to the present disclosure, in order to position the exciter module, a plurality of heat sink-side positioning sections may be inserted into a plurality of exciter module-side positioning sections, or vice versa. In some embodiments, two heat sink-side positioning sections may be inserted into two exciter module-side positioning sections, or vice versa. If only one positioning section were provided, the positioned exciter module could have a degree of freedom of movement, particularly if the positioning sections were cylindrical or rotationally symmetrical, which would be disadvantageous for the purpose of low tolerance. A plurality of, or two, heat sink-side positioning sections and exciter module-side positioning sections cancel out this degree of freedom of movement.

A soldered and/or sintered connection may be formed to attach the power module to the heat sink. The attachment of the power module to the heat sink by way of these attachment methods typically leads to a sufficiently low tolerance regarding the positioning of the power module, such that the overall tolerance required for the present disclosure regarding the power module and the exciter module is achieved, enabling the common control board to be plugged onto the connecting pins of the modules.

In some embodiments, the power module and the exciter module may be attached on a common face of an outside of the heat sink or on multiple faces of the outside of the heat sink pointing in the same direction. The heat sink may have a top side forming the common face of the outside, on which the modules may be arranged and attached. If the modules are attached to outside faces pointing in the same direction, then these outside faces may run parallel to one another. In such embodiments, the heat sink may have a stepped shape, with the outer sides pointing in the same direction representing or forming these steps. In such embodiments, the connecting pins may protrude from the top of the respective module, such as vertically.

In some embodiments, the exciter module and several power modules may be attached next to each other along a row on the common outside face of the heat sink. The modules may be arranged adjacent to one another, and may be directly adjacent to one another in some embodiments. The heat sink may be elongated, wherein the modules may be arranged along the longitudinal direction of the heat sink. The modules, such as the power modules, and the heat sink may have the same width, such that these modules are laterally aligned with the heat sink.

The connecting pins may be press-fit pins. When the control board is plugged onto the connecting pins, these connecting pins may be pressed into plated-through sleeves on the control board in order to form the required electrical contacts.

With regard to the heat sink, the heat sink may have cooling fins and/or cooling ducts through which a cooling fluid may be guided. The cooling fins may be configured as projections along which a cooling air flow can be guided. For example, the cooling fins may be provided on the underside of the heat sink. The cooling ducts may run through the interior of the heat sink and may run in a meandering manner. The heat sink may have connection interfaces, such as connecting pieces or the like, configured to supply and discharge the cooling fluid into the cooling ducts.

The electrical circuit device for operating an externally excited electric machine provided according to the present disclosure may comprise a heat sink, wherein at least one power module may be attached at a marked attachment position on an outside of the heat sink, with an exciter module being attached on the outside of the heat sink. At least one heat sink-side positioning section of the heat sink may be inserted into at least one exciter module-side positioning section of the exciter module, or vice versa. The electrical circuit device may form a drive converter. All aspects, advantages and features explained in connection with the method according to the present disclosure can be equally transferred to the electrical circuit device according to the present disclosure, and vice versa.

Additionally, an electric drive device according to the present disclosure may include an electrical circuit device as described above and an electric machine connected to the electrical circuit device. All aspects, advantages and features explained in connection with the method according to the present disclosure and the electrical circuit device according to the present disclosure are equally transferable to the electric drive device according to the disclosure, and vice versa.

The electric machine may be an externally excited electric machine, such as an externally excited synchronous machine. In such embodiments, the stator of the electric machine may be connected to the inverter circuit implemented by the power module and a rotor winding or exciter winding of the electric machine may be connected to the exciter circuit implemented by the exciter module.

Furthermore, a motor vehicle that comprises an electric drive device as described above is disclosed herein. All aspects, advantages and features explained in connection with the method according to the present disclosure, the electrical circuit device according to the present disclosure and the electric drive device according to the present disclosure are equally transferable to the motor vehicle according to the present disclosure, and vice versa.

The electric machine of the electric drive device may be a traction electric motor of the motor vehicle. The electrical circuit device may be connected on its DC side, such as via a capacitor, to a DC on-board electrical system of the motor vehicle. The electrical circuit device may be connected to an electrical energy storage device, for example a traction battery, of the motor vehicle via the DC on-board electrical system.

The DC on-board electrical system may be designed as a high-voltage on-board electrical system, for example with a voltage level between 200 V and 1200 V. In some embodiments, the voltage level may be 800 V. The motor vehicle may be a purely electric vehicle or a hybrid vehicle, for example a plug-in hybrid vehicle. The motor vehicle may have one or more electric drive devices, wherein the electric machines may each be assigned to a wheel or an axle of the motor vehicle.

DETAILED DESCRIPTION

Figure 1:
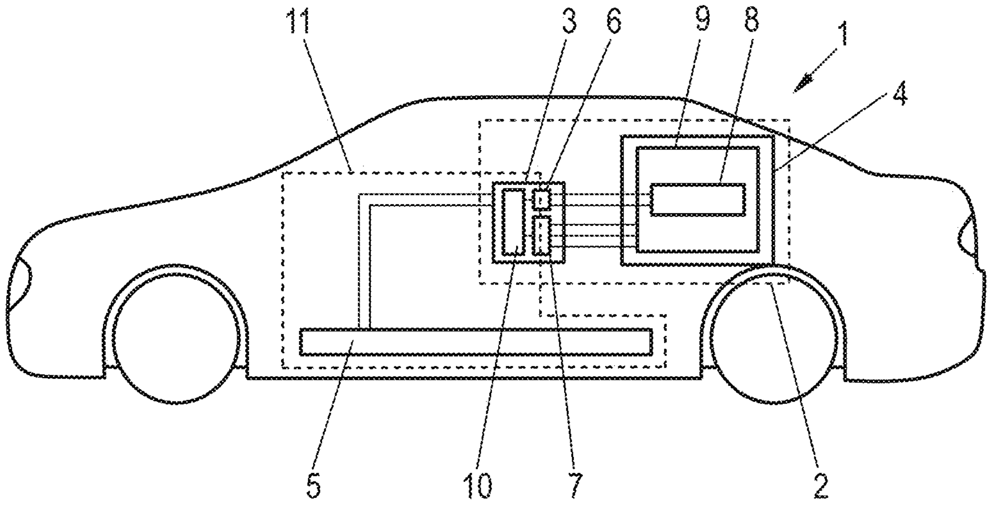
FIG. 1 shows a motor vehicle comprising an electric drive device which has an electrical circuit device.

An exemplary embodiment of a motor vehicle 1 according to the present disclosure is shown in FIG. 1. Motor vehicle 1 may include an electric drive device 2 according to the present disclosure according to an exemplary embodiment, wherein electric drive device 2 may include an electric circuit device 3 according to the present disclosure according to an exemplary embodiment and an electric machine 4 connected to electrical circuit device 3. Electric machine 4 may be configured as an externally excited electric machine, for example as an externally excited synchronous machine, and may form a traction electric motor of motor vehicle 1.

To supply electric machine 4 with electrical energy and/or to absorb energy recuperated via electric machine 4, motor vehicle 1 may include an energy storage device 5, which may be configured, for example, as a traction battery. Energy storage device 5 may be connected to electrical circuit device 3. Electrical circuit device 3 may configured to operate electric machine 4. In addition or as an alternative to energy storage device 5, motor vehicle 1 may also have an energy source connected to electrical circuit device 3, for example a fuel cell.

Electrical circuit device 3 may include an exciter module 6 and at least one power module 7 forming an inverter module. Exciter module 6 and power module 7 may be cast or molded structural components. Exciter module 6 may include electronic structural components and may implement an exciter circuit. Power module 7 may also include electronic structural components and may implement an inverter circuit. Exciter module 6 may be connected to a rotor 8 of electric machine 4 and power module 7 may be connected to a stator 9 of electric machine 4. An excitation current may be generated via exciter module 6, with which rotor 8 or a rotor or excitation winding of rotor 8 may be energized. For this purpose, exciter module 6 may be configured to convert a direct current taken from energy storage device 5 into an excitation current, which may also be a direct current.

Power module 7 may be configured to convert a direct current taken from energy storage device 5 into an alternating current. In such embodiments, several power modules 7 may be provided in order to convert a multi-phase alternating current and to use this to energize stator 9 or a stator winding of stator 9. Specifically, three power modules 7 may be provided to convert a three-phase alternating current. In this way, electric machine 4 may be operated in motor mode. Conversely, power modules 7 may also be configured to convert an alternating current generated by electric machine 4 into a direct current in generator operation of electric machine 4 and to use this direct current, for example, to charge energy storage device 5.

Electrical circuit device 3 may further include a capacitor 10, which may be arranged on the direct current side of power modules 7 or on the side of the exciter module 6 connected to electrical energy storage 5. This capacitor 10 may also be referred to as an intermediate circuit capacitor and may be configured as an X capacitor of electrical circuit device 3 or a DC subsystem 11 of motor vehicle 1. DC subsystem 11 may form an on-board electrical system or on-board subsystem of motor vehicle 1 and may be configured as a high-voltage on-board electrical system, for example with a voltage level between 200 V and 1200 V. The voltage level of the high-voltage on-board electrical system may be 800 V.

Figure 2:
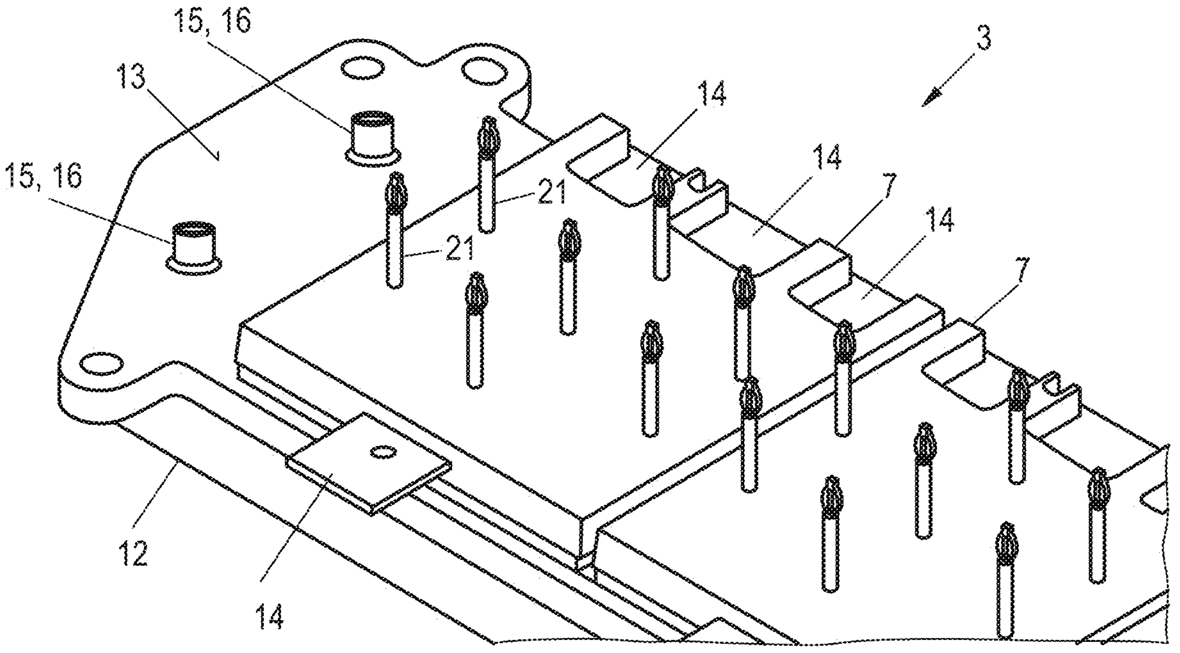
FIG. 2 shows a perspective view of the electrical circuit device of the motor vehicle of FIG. 1.
Figure 3:
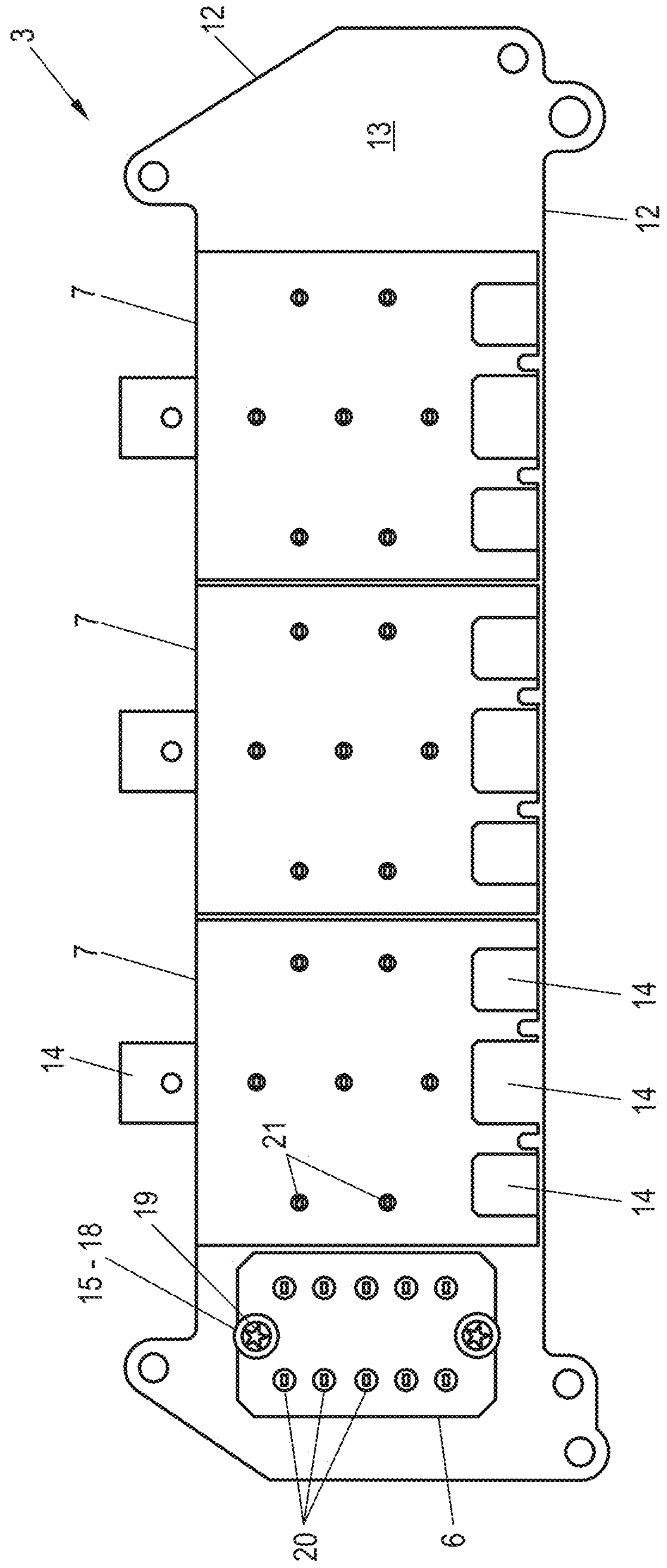
FIG. 3 shows a top view of the electrical circuit device of FIG. 2.
Figure 4:
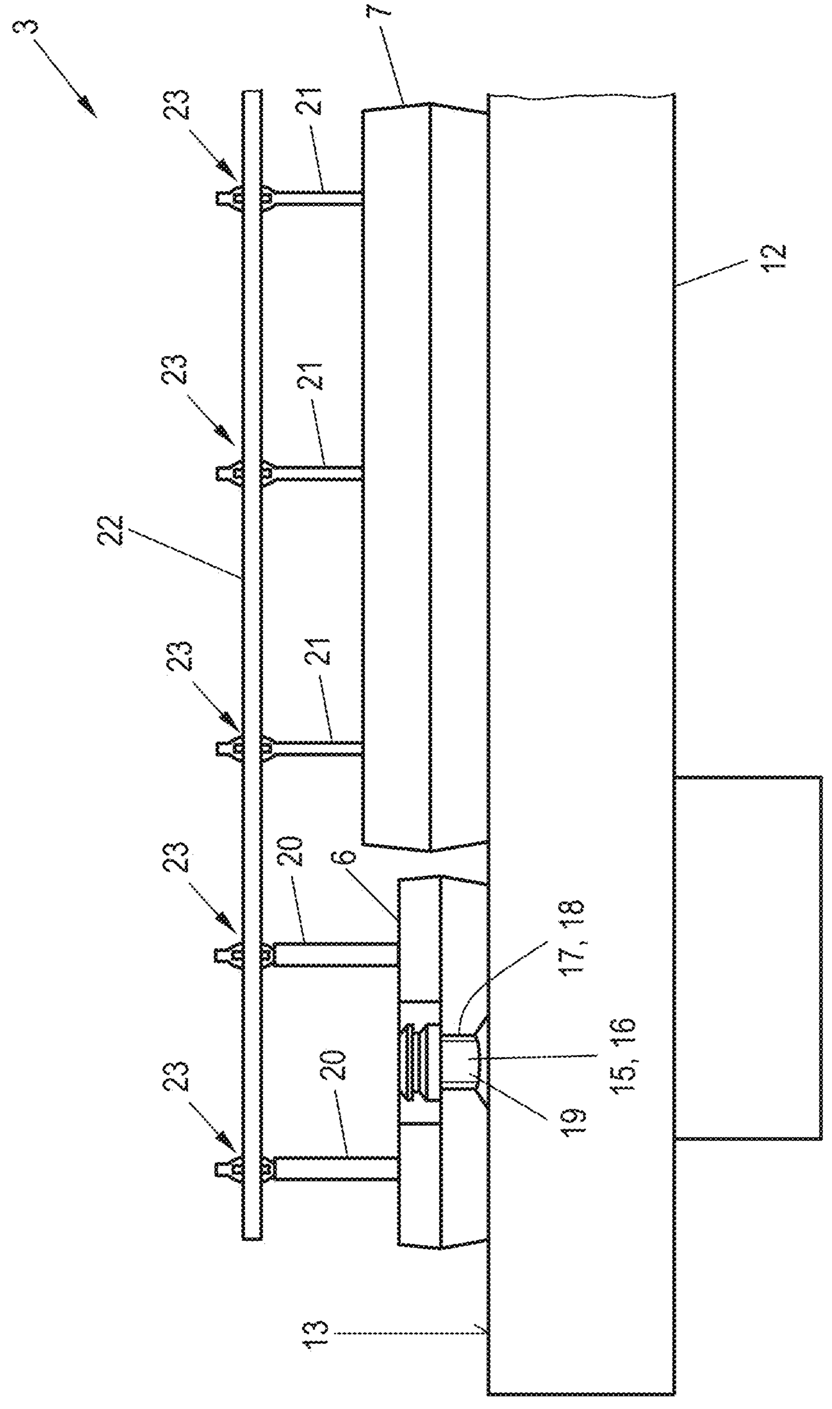
FIG. 4 shows a longitudinal cross-sectional view of the electrical circuit device of FIG. 2.

FIGS. 2 to 4 each show a detailed view of the electrical circuit device 3, with capacitor 10 not being shown for reasons of clarity. FIG. 2 shows a perspective view, FIG. 3 shows a top view, and FIG. 4 shows a longitudinal section of the electrical circuit device 3. Furthermore, an exemplary embodiment of a method according to the present disclosure for producing the electrical circuit device 3 is explained with reference to FIGS. 2 to 4.

With reference to FIG. 2, to produce electrical circuit device 3, a heat sink 12 may first be provided, which may have cooling fins and/or cooling ducts (not shown in detail in the figures) for cooling exciter module 6 and power modules 7. For this purpose, heat sink 12 may have corresponding connection interfaces such as connection pieces. Heat sink 12 may be a substantially cuboid structural component with an outside 13 forming an upper side, on which exciter module 6 and power modules 7 may be arranged.

In the next method step, power modules 7 may be positioned and attached on outside 13 of heat sink 12. Power modules 7 may be arranged in a marked or predetermined attachment position on outside 13 and attached to heat sink 12 by way of a soldering and/or sintering bond. As can be seen in FIG. 2, substantially cuboid power modules 7 may each have laterally arranged contact points 14, which form the DC connections of the respective module and may be in the form of contact tabs or pads arranged laterally on respective power module 7.

In the next method step, exciter module 6, which is not shown in FIG. 2, may be positioned on outside 13 of heat sink 12. Heat sink 12 may have heat sink-side positioning sections 15 on outside 13, such as two insertion cylinders 16. Furthermore, exciter module-side positioning sections 17 of exciter module 6 may be provided for this purpose, such as two bores or recesses 18, each of which has a matching opposite shape with respect to insertion cylinder 16. Specifically, insert cylinders 16 are inserted into recesses 18 to position exciter module 6. The outer diameters of insert cylinders 16 correspond to the inner diameters of recesses 18, such that a fitting connection may be formed to achieve the lowest possible tolerance.

The exciter module may then be attached to outside 13 of heat sink 12. FIG. 4 shows that recesses 17 may pass through exciter module 6 over its entire width. Hollow insertion cylinder 16 may have an internal thread along its longitudinal direction, with a screw 19 being screwed into the internal thread of insertion cylinder 16 via the open side of recess 17 in order to attach exciter module 6 to heat sink 12. Alternatively, insertion cylinder 16 may be a hollow rivet into which a rivet is inserted to attach exciter module 6 to heat sink 12.

FIG. 4 shows the state of electrical circuit device 3 during the manufacturing process after modules 6, 7 have been attached to heat sink 12. As can be seen, modules 6, 7 may be attached to common face of the outside 13 of heat sink 12. Exciter module 6 and power modules 7 may be arranged and attached next to each other and along a row on common face of the outside 13. However, in some embodiments, modules 6, 7 may be attached to different outside faces of heat sink 12. Modules 6, 7 may point in the same direction. Specifically, exciter module-side connecting pins 20 of exciter module 6 and power module-side connecting pins 21 of respective power module 7 may point in the same direction with respect to their open end sections. For reasons of clarity, not all connecting pins 20, 21 shown in the figures are provided with the corresponding reference numbers.

In the next step, a common control board 22 may be plugged onto the open end sections of connecting pins 20, 21. This may establish electrical connections between the semiconductor components of modules 6, 7 and control board 22, so that modules 6, 7 can be controlled by way of control board 22. Control board 22 may be a printed circuit board which is equipped with semiconductor electronic components required to control modules 6, 7. Connecting pins 20, 21 may be press-fit pins. When control board 22 is plugged onto connecting pins 20, 21, these connecting pins 20, 21 may be pressed into plated-through sleeves 23 of control board 22 in order to form the required electrical contacts.

German patent application no. 102023111216.3, filed May 2, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing an electrical circuit device for operating an externally excited electric machine, the method comprising:

positioning and attaching at least one power module at a marked attachment position on an outside of a heat sink, the at least one power module including power module-side connecting pins;

positioning at least one exciter module on the outside of the heat sink, the at least one exciter module including exciter module-side connecting pins, wherein at least one heat sink-side positioning section is inserted into at least one exciter module-side positioning section, or wherein at least one exciter module-side positioning section is inserted into at least one heat sink-side positioning section; and attaching the exciter module to the outside of the heat sink, wherein, after attaching the power module and the exciter module to the heat sink, a control board is plugged onto the power module-side connecting pins and the exciter module-side connecting pins pointing in the same direction.

2. The method according to claim 1, wherein, when the at least one heat sink-side positioning section is inserted into the at least one exciter module-side positioning section or when the at least one exciter module-side positioning section is inserted into the at least one heat sink-side positioning section, a fitting connection is formed.

3. The method according to claim 1, wherein one of the heat sink-side and the exciter module-side positioning sections is an insert cylinder and the other positioning section includes a recess of an opposing shape of the insertion cylinder.

4. The method according to claim 3, wherein the exciter module-side positioning section is configured to include the recess, the exciter module-side positioning section passing through an entire width of the exciter module, and wherein the insertion cylinder is hollow along a longitudinal direction of the insertion cylinder, the insertion cylinder having an internal thread configured such that a screw is screwed therein to attach the exciter module to the heat sink or having a hollow rivet configured such that a rivet is inserted therein to attach the exciter module to the heat sink.

5. The method according to claim 3, wherein the heat sink-side portion is an insert cylinder and the exciter module-side positioning section includes a recess of an opposing shape of the insertion cylinder.

6. The method according to claim 1, wherein a plurality of heat sink-side positioning sections are inserted into a plurality of exciter module-side positioning sections, or a plurality of exciter module-side positioning sections are inserted into a plurality of heat sink-side positioning sections, such that the exciter module is positioned.

7. The method according to claim 6, wherein two heat sink-side positioning sections are inserted into two exciter module-side positioning sections, or two exciter module-side positioning sections are inserted into two heat sink-side positioning sections, such that the exciter module is positioned.

8. The method according to claim 1, wherein each of the at least one power modules is attached to the heat sink by a soldered and/or sintered connection.

9. The method according to claim 1, wherein the at least one power module and the at least one exciter module are attached on the outside of the heat sink such that the at least one power module and the at least one exciter module point in the same direction.

10. The method according to claim 9, wherein the at least one exciter module and a plurality of the power modules are attached next to each other along a row on the outside of the heat sink.

11. The method according to claim 10, wherein the at least one exciter module and three power modules are attached next to each other along a row on the outside of the heat sink.

12. The method according to claim 1, wherein the power module-side and exciter module-side connecting pins are press-fit pins.

13. The method according to claim 1, wherein the heat sink has cooling fins and/or cooling ducts through which a cooling fluid can be guided.

14. An electrical circuit device for operating an externally excited electric machine, the electrical circuit device comprising:

a heat sink;

at least one power module attached at a marked attachment position on an outside of the heat sink, the at least one power module including power module-side connecting pins;

an exciter module attached on the outside of the heat sink, the at least one exciter module including exciter module-side connecting pins; and a control board plugged onto the power module-side connecting pins and the exciter module-side connecting pins, wherein the power module-side connecting pins and the exciter module-side connecting pins point in a same direction, and wherein at least one heat sink-side positioning section of the heat sink is inserted into at least one exciter module-side positioning section of the exciter module or at least one exciter module-side positioning section of the exciter module is inserted into at least one heat sink-side positioning section of the heat sink.

15. An electric drive device comprising:

an electrical circuit device according to claim 14; and an electric machine connected to the electrical circuit device.

16. A motor vehicle comprising an electric drive device according to claim 15.

* * * * *